April 19, 1966  SETSUO HIGASHI ETAL  3,246,998
IMPRESSION MATERIAL
Filed Nov. 2, 1962  8 Sheets-Sheet 1

(a) before setting
A ··· filler
B ··· alginate
C ··· water (b) after setting

INVENTORS
Setsuo Higashi
Kunio Taguchi

BY
ATTORNEY

––––––– Hydrogen bonds

3,246,998
IMPRESSION MATERIAL
Setsuo Higashi, 19—8 Kasumigaoka-danchi, Fukuoka-machi, Iruma-gun, Saitama Prefecture, Japan, and Kunio Taguchi, 1151 Oumachi, Kamakura, Kanagawa Prefecture, Japan
Filed Nov. 2, 1962, Ser. No. 235,051
14 Claims. (Cl. 106—35)

The present invention deals with an impression material for reproducing contours and, particularly, to the provision of an improved impression material for use in taking dental impressions.

The earliest dental impression material employed extensively was plaster of Paris. This type of material, however, was not only difficult to remove after the impression was made, but could not reproduce undercut portions so that its applicability was limited.

Some use has also been made of thermoplastic impression materials having a base of shellac, the composition being such that it became fluid by warming in hot water and solidified by cooling in air. The fluidity made it very convenient to use the material in taking impressions, but at the same time the tendency to flow resulted in substantial deviations or deformations of the impressions from the original pattern or model so that accuracy was sacrificed.

One of the better dental impression compositions presently available contains the elastic substance agar-agar which is a colloid recovered from seaweeds and kelp. This material becomes fluid upon warming and solid by cooling in air to produce an elastic set material. Generally, it is used in the form of sodium alginate or potassium alginate, both of which reacted with plaster of Paris to produce the corresponding alkali metal sulfate and a calcium alginate. The production of calcium alginate was the principal reaction involved in setting of the alginate impression material. It is common practice to employ some phosphate of a strongly alkaline element such as sodium to produce a retarding effect on the reaction which produces calcium alginate. The addition of phosphates, however, raised a further problem of tolerating these materials in the oral cavity.

Alginate impression materials used in dentistry are employed in two different types, paste and powder. The paste material is made by mixing the sodium or potassium alginate and other soluble ingredients and then dissolving the mixture in an adequate amount of water to produce a viscous liquid which is then mixed with insoluble fillers, perfumes, and pigments to produce a paste material. This material is used in impression taking by spatulating it with the required amount of plaster of Paris.

The powder material is made by mixing the same ingredients, as in the case of the paste with the plaster of Paris, and then setting this mixture with an appropriate amount of water when applied to the pattern.

The use of powder has the advantages of ease of storing and transportation but has disadvantages in manufacturing and in certain characteristics when used. Conversely, the paste material has advantages of economy and characteristics during use but has disadvantages when it comes to transportation, storage, and changes in quality.

The alginate impression materials have a great advantage in their ease of manipulation in comparison with other impression materials, and also are quite cheap. In this respect, they are considerably cheaper than the rubber base or silicone impression materials which produce a better impression but at a substantially higher price.

One of the chief difficulties with alginate impression materials is the necessity of very prompt pouring of the plastic slurry because of the substantial shrinkage which occurs immediately after setting of the material, and the dimensional changes which become greater as time progresses. Another disadvantage stems from the fact that the surface of the pattern which is produced by the alginate impression material is likely to become very coarse because the setting of this material is brought about by the gelation of aqueous sols similar to the reactions involved in the setting of the plaster. This disadvantage remains despite attempts to correct it by surface fixing operations involving dipping in zinc salts and other solutions.

Because of these disadvantages, alginate materials are giving way to some extent to the rubber base impression material including polysulfide rubber compounds. However, this polysulfide material has its own disadvantages such as unpleasant smell, difficulty in treatment, slow setting rate, and substantially higher costs.

Accordingly, an object of the present invention is to provide an improved alginate type impression material which does not possess the disadvantages of the alginate materials presently available commercially.

Still another object of the invention is to provide an improved dental impression material of relatively low cost but superior characteristics.

A further object of the invention is to provide an improved impression material with excellent reproducibility characteristics.

We have now found that excellent impression compositions can be made by including in these compositions an alkanol amine salt of alginic acid, preferably one in which the alkanol groups contain from one to two carbon atoms.

Alginic acid is derived from naturally occurring seaweed and kelp and has the following formula:

$$(C_5H_7O_4COOH)_n$$

The alginic acid is a polyuronic acid composed of beta-D-mannuronic acid residues linked so that the carboxyl groups of each unit are free while the aldehyde groups are shielded by a glycosidic linkage.

The generic formula for the alkanol amines can be written as follows:

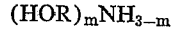

$$(HOR)_m NH_{3-m}$$

where R is an alkylene group.

Typical alkanol amines which are useful for the purpose of the present invention are diethanol amine, monoethanol amine, trimethanol amine, dimethanol amine, monomethanol amine, and triethanol amine.

A further description of the present invention will be made in conjunction with the attached sheets of drawings in which.

Figure 3:
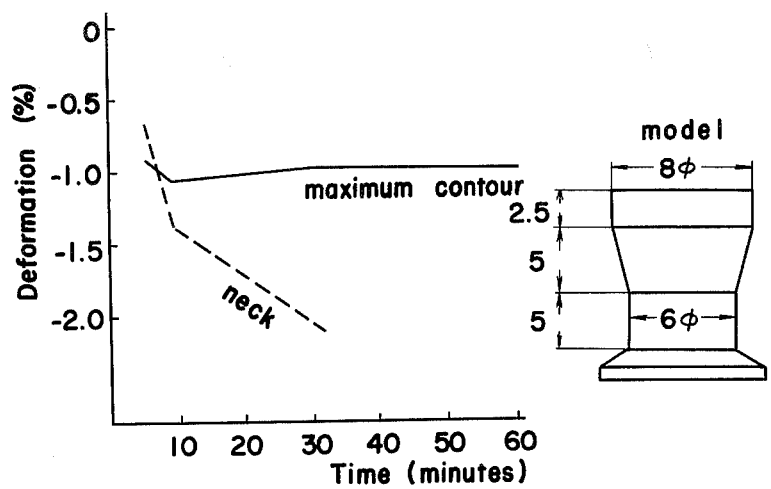
FIGURE 3 is a graph of the deformation versus the time of pouring the plaster slurry, illustrating the deformation which occurs with conventional alginate impression materials at various points.
Figure 4:
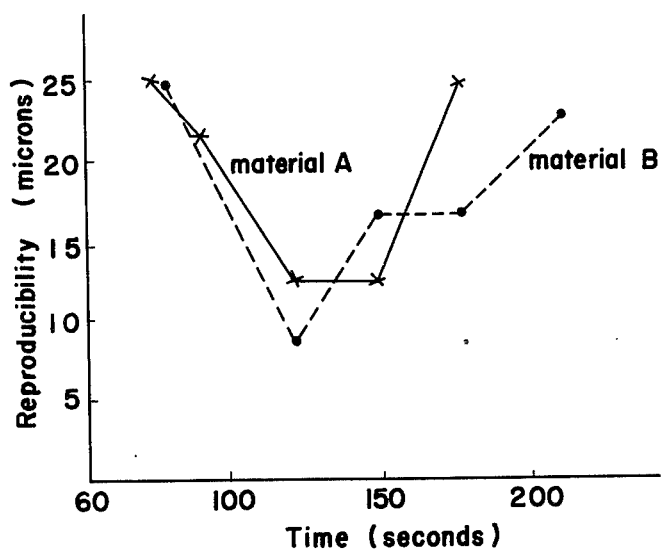
FIGURE 4 is a graph plotting the reproducibility of fine lines in an alginate impression material as a function of the time.
Figure 7:
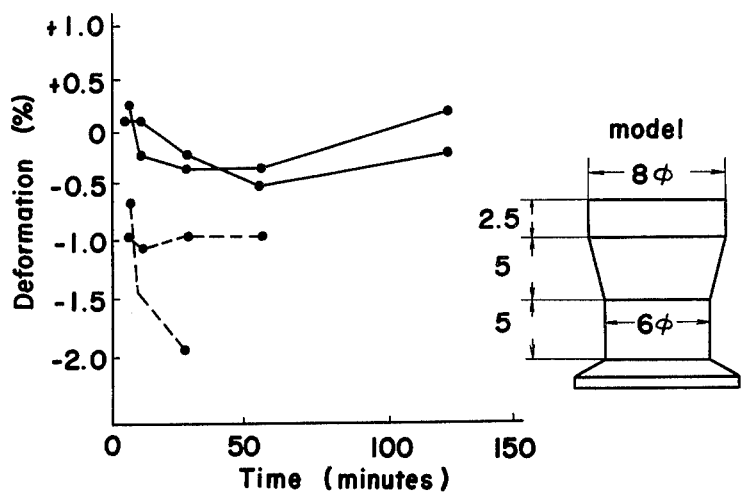
Figure 8:
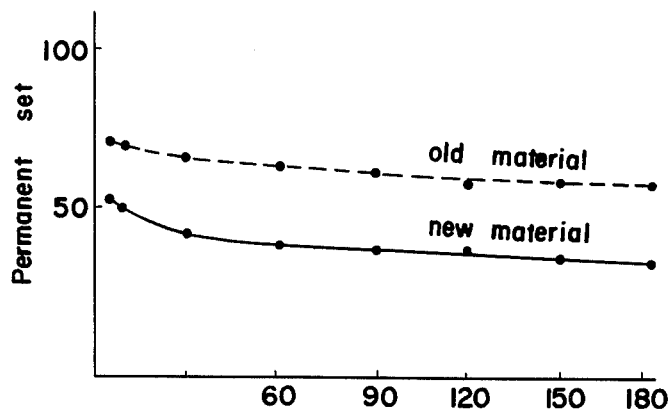
Figure 9:
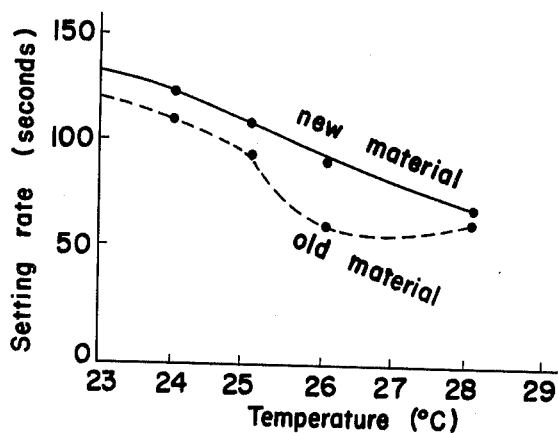
Figure 10:
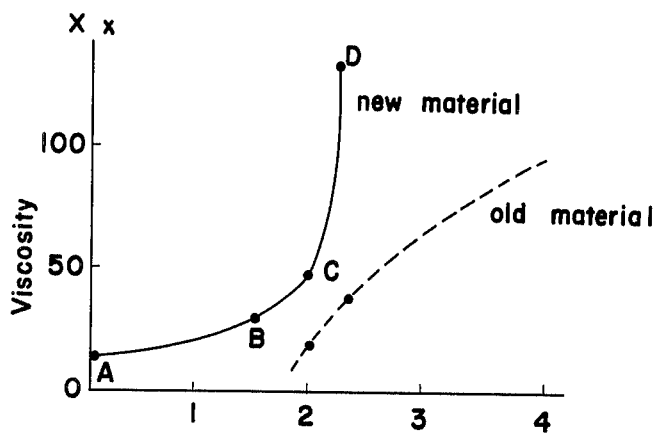
Figure 11:
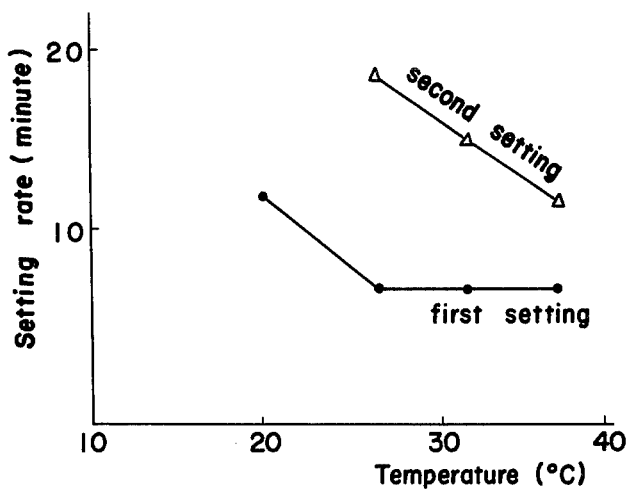
Figure 12:
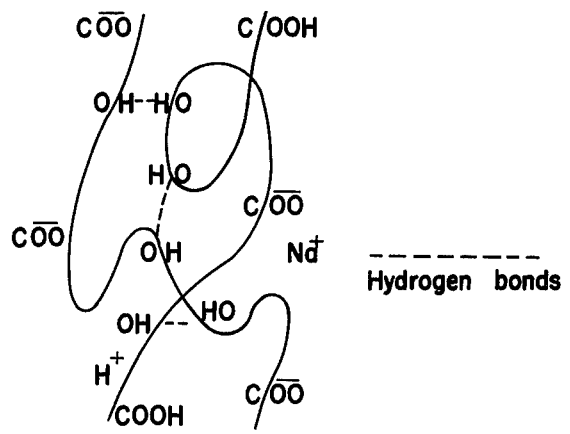
Figure 13:
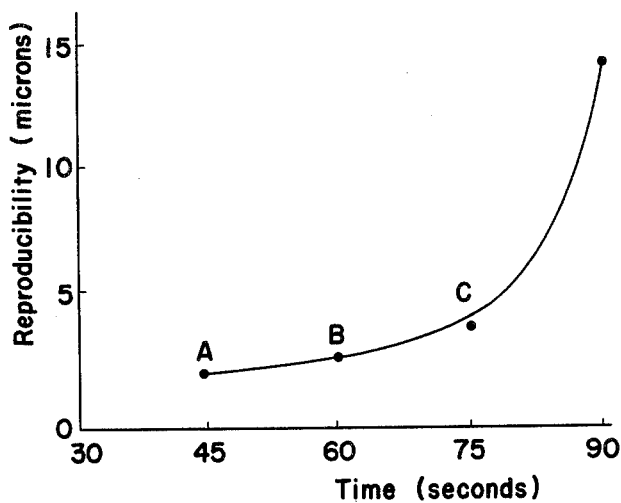
Figure 14A:
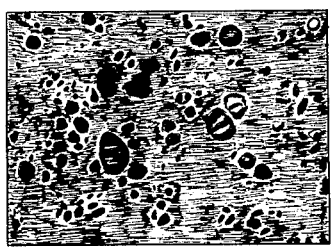
Figure 14B:
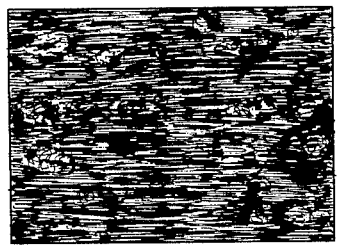
Figure 15:
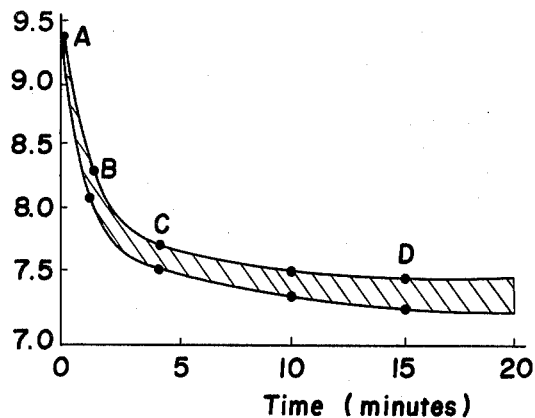
Figure 16:
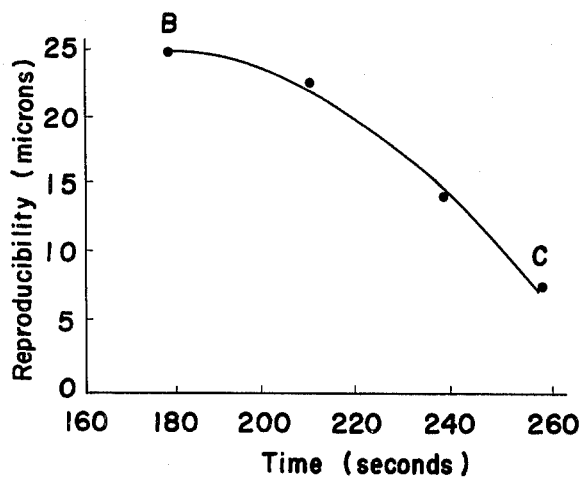

is a sketch from a photograph at the same magnification showing the surface of the plaster pattern;

FIGURE 7 is a graph similar to FIGURE 3, but illustrating the results obtained with the impression materials of the present invention;

FIGURE 8 is a graph comparing the permanent set of the new and old materials plotted against time in minutes;

FIGURE 9 is a graph illustrating the relationship between setting rate and temperature for the new and old materials;

FIGURE 10 is a graph illustrating the change in viscosity of the new and old materials with time;

FIGURE 11 is a plot of setting time versus temperature, illustrating the two steps involved in the setting of conventional alginate materials;

FIGURE 12 is a diagrammatic illustration of the hydrogen bonding which occurs among hydroxyl radicals in the alginate molecule;

FIGURE 13 is a graph similar to FIGURE 4, but illustrating the reproducibility of the new material of the present invention;

FIGURE 14(a) is a sketch based on a photomicrograph of the impression surface of the new material, magnified two hundred times and FIGURE 14(b) is a similar sketch of the plaster pattern surface;

FIGURE 15 is a graph illustrating the change in pH during setting of the new material; and FIGURE 16 is a plot of the reproducibility of the new material against time in a selected portion of the plot of FIGURE 15.

Figure 1:
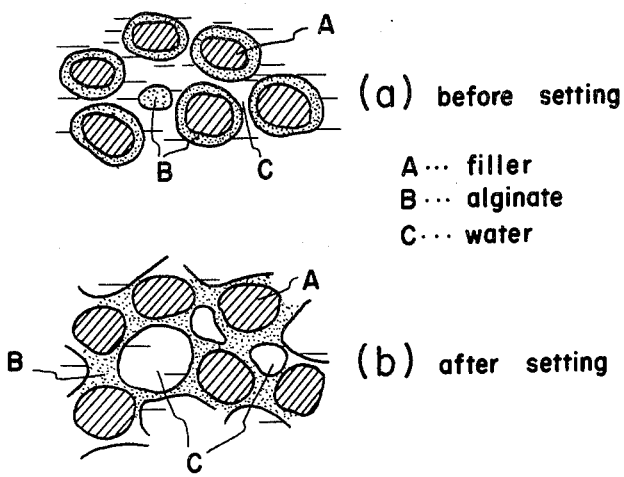
FIGURE 1 is a reproduction of microscopic observations of the setting of conventional alginate materials, both before and after setting.
Figure 2:
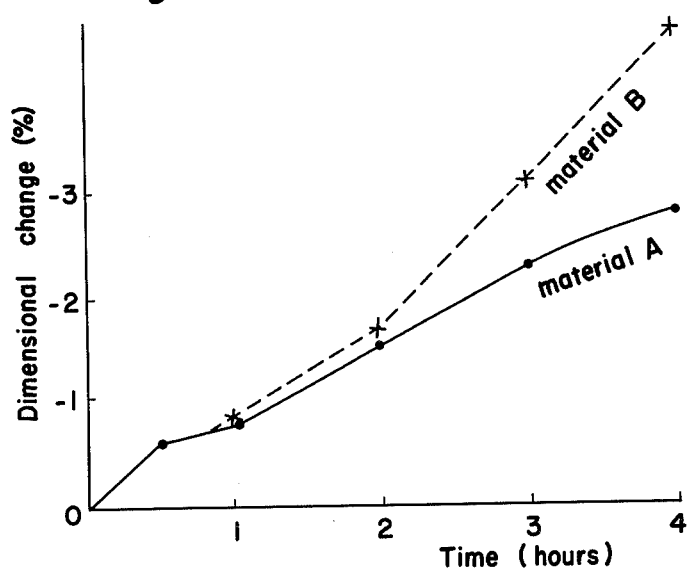
FIGURE 2 is a graph illustrating the dimensional change occurring with time for conventional alginate materials.

In FIGURE 1, we have attempted to illustrate the setting mechanism of conventional alkali metal alginate materials presently available. It will be noted that the aqueous sols of calcium alginate contain much water and that this water remains trapped within the alginate material after setting. This material is naturally liable to volumetric shrinkage over a considerable time due to the evaporation of this water. This has been illustrated in FIGURE 2 of the drawings which illustrates the dimensional changes occurring in two alginate materials available commercially as a function of time.

In FIGURE 3, the deformation caused by this dimensional change has been illustrated for the alginate material of the prior art. The model illustrated in FIGURE 3 approximates the human molar. The alginate impression material was molded about this metallic model and the deformation at various times at the neck portion and at the area of maximum contour are set forth in the graph. The times involved were measured from the beginning of the mixing operation, and the deformation percent was calculated by comparing the dimensions of the plaster pattern to the metallic model in the designed areas. From FIGURE 3 it will be seen that there was a deformation of more than 0.5% in both the areas, and that this shrinkage became greater as time elapsed.

The reproducibility of the impression materials was determined by observing the ability to reproduce fine lines engraved on the metallic pattern. The time of applying the mixture of impression material onto the metallic pattern, measured from the beginning of the mixing operation is plotted on the horizontal axis and the reproducibility, represented by the thickness of the finest line, in microns, that could be reproduced on the impression is plotted on the vertical axis. Materials A and B referred to in FIGURE 4 are typical alginate impression materials sold in Japan.

From FIGURE 4 it will be observed that the reproducibility improved in both cases after a time interval of about 120 to 140 seconds and then deteriorated from then on. The absolute value of the finest reproducibility was about 10 microns, and this is substantially less than can be achieved with rubber base impression materials.

Figure 5A:
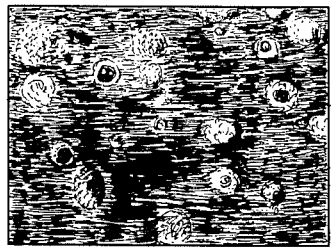
FIGURE 5(a) is a sketch taken from a photograph at a magnification of two hundred times illustrating the impression surface of the alginate material.
Figure 5B:
FIGURE 5(b) is a sketch at the same magnification of the surface of the plaster pattern.
Figure 6A:
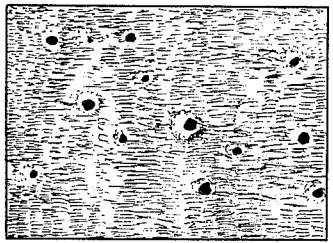
FIGURE 6(a) is a sketch of a microscopic photograph of rubber base impression materials and FIGURE 6(b)
Figure 6B:
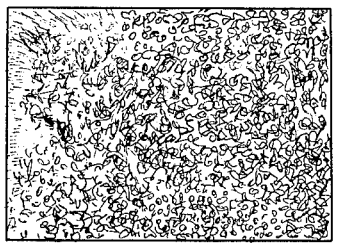

In FIGURE 5, we have depicted the characteristics of the surface of the impression material and of the plaster pattern, both of which appear to be very coarse as compared with comparable surfaces on a rubber base impression material as shown in FIGURE 6.

The alkanol amine salts of alginic acid represent a substantial improvement in characteristics over the presently available alginate impression materials. They are easier to reproduce, are more reproducible, and have excellent storage properties.

In addition to the alkanol amine salts of alginic acid, the compositions of the present invention also preferably include strongly alkaline salts of carbonic acid such as sodium carbonate, potassium carbonate, sodium bicarbonate, potassium bicarbonate, and the like. It is also advisable to add a water insoluble carbonate to the composition instead of the usual silica, zinc oxide, or diatomaceous earth which were frequently mixed with alignate impression materials. The preferred insoluble carbonate is calcium carbonate.

As far as ranges of ingredients are concerned, we prefer to use one part by weight of the alkanol amine salt of alginic acid with 0.3 to 1.4 parts by weight of the alkali metal salt of carbonic acid, and from 0.3 to 2.0 parts by weight of the water insoluble carbonate, when making a paste material. For the preparation of a dry powdered material, we combine about one part by weight of the alkanol amine salt with from 1 to 3 parts by weight of the alkali metal salt of carbonic acid, and 1 to 3 parts by weight of the water insoluble carbonate.

In the preparation of a typical paste type impression material, five to ten kilograms of the triethanol amine salt of alginic acid are combined with from three to seven kilograms of the alkali metal salt of carbonic acid and three to 10 kilograms of the insoluble carbonate. Then, from 80 to 90 kilograms of water are added to the mixture and the mixture is stirred for about two hours to produce a viscous slurry. This material can be further mixed on any suitable mixing apparatus such as a mixing roll to produce a paste type impression material. This paste in settable within several minutes by mixing the paste with about one tenth part by weight of plaster of Paris. Any suitable perfume or pigment can also be used in the composition.

In the manufacture of a powder type material, one part by weight of the alkanol amine salt of alginic acid is mixed with from three to five times its weight of water and the mixture is thoroughly spatulated. During the mixing, one to three parts by weight of the strongly alkaline salt of carbonic acid is added together with one to three parts by weight of the insoluble carbonate, together with any desired amounts of perfume and pigment. The mixture is then dried and crushed into a very fine powder. The impression material is then made by adding one to three parts by weight of the plaster to the previously dried powder.

FIGURE 7 illustrates the deformation characteristics of the new material by means of the solid line representation, and that of the old alginate material by means of the dotted line representation. It will be seen from FIGURE 7, that the maximum deformation of the new material is very substantially less than could be achieved with the material of the prior art. In fact, the deformation observed was even less than could be achieved with conventional rubber base type impression materials. Furthermore, the deformation remains fairly constant over a period of time which is not true of the conventional alginate materials.

The permanent set of the new material and the old material was determined by means of a Pussey and Jones plastometer. Cylindrical test pieces, 35 millimeters in diameter and 12 millimeters in height were provided with a one kilogram static load for 30 seconds by pressing a semi-spherical plunger of 3.5 millimeters in diameter against the test pieces to a depth of about one millimeter. It will be observed from FIGURE 8 that the permanent set of the new material is substantially less than that of the old material. The scale used in the vertical axis of FIGURE 8 was the indication of the plastometer which measured 100 times the true permanent set in millimeters.

The relationship between setting rate and surrounding temperature of the new and old materials is illustrated in FIGURE 9. It will be noted that the setting rate for the new material varies substantially linearly with temperature whereas in the case of the old material, there is a definite concave portion in the plot.

The setting rate for the known alginate materials indicates that such materials exhibit a rate of gelation consistent with the Von Weimarn equation.

$$V = K\frac{Q-S}{S}$$

where V is the rate of gelation, Q is the total concentration of colloids, S is the solubility of the colloidal substance, and K is a constant. It will be seen from the above equation that when Q becomes far larger than S, namely when a super saturated colloidal solution exists, then the rate of gelation is substantially directly proportional to the total concentration of colloids and independent of the surrounding temperature.

In contrast, with the new material, the setting rate satisfies very closely the equation of Arrhenius:

$$\ln V = \frac{E}{RT} + k$$

where V is the reaction velocity, E is the internal energy, R is the gas constant, T is the absolute temperature, and k is a constant.

From these observations, we have concluded that the new material sets by reason of chemical reaction rather than through a gelation procedure. To substantiate this theory, we have measured the viscosity change and the results are depicted in FIGURE 10. The solid line represents the viscosity change of the new material, and the dashed line that of the conventional alginate material. It will be seen that the new material has a substantially logarithmic curve characteristic of high molecular weight material whereas the viscosity change for the old material is characteristic of colloidal substances.

From the observed characteristics, it is believed that the setting of the old alginate material occurred in two steps, the first being the gelation of aqueous sols, and the second the chemical reaction caused by the formation of hydrogen bonds among the hydroxy radicals of the molecular structure. The differences in setting characteristics are illustrated in FIGURE 11, and a schematic representation of the bonding occurs in FIGURE 12.

FIGURE 13 illustrates the reproducibility of the new material. It will be observed that the changes in reproducibility correspond to the changes in viscosity illustrated in FIGURE 10.

We also made microscopic observations of the impression surface and the plaster pattern surface, and these are reproduced in FIGURE 14. It is clear that the new material contains very fine surfaces, and that these surfaces are reflected in the plaster pattern. None of the coarseness, characteristic of typical alginate materials, appear to be present in the new material.

Because the new material shows rapid changes in viscosity as well as in reproducibility, as illustrated in FIGURES 10 and 13, it is important to keep a control over the process of setting. The change in pH which occurs during the setting of the material is graphically illustrated in FIGURE 15, the shaded area represented the range of change of pH observed. Corresponding points in time are labeled at letters A to D inclusive on FIGURES 10, 13 and 15. In the range AB, the pH value descends rapidly from about 9.3 (the pH value of a mixture of triethanol amine salt of alginic acid and sodium carbonate) to about 8.0 due to the addition of plaster which has a pH of 5. This descending curve is almost coincident with the curve obtained when the plaster is mixed with 0.1 N ammonium hydroxide solution.

In the range BC, hydrogen bonding among the hydroxy radicals appears to be completed, so that the viscosity rises rapidly. The pH drops somewhat from about 8.0 to 7.5, due to the production of neutral salts such as sodium sulfate.

In the range CD there is a relaxation of the internal energy and so the change in pH value is very slight.

It is most important to be able to detect the range BC, because in this range the reproducibility of impression can be changed considerably by applying the slurry of the impression material onto the model, as illustrated in FIGURE 16. In order to detect the existence of this state, several methods can be employed. The first employs indicating reagents which provide a discernible color change at a pH less than about 8.0. This indicator is preferably combined with another which provides a discernible color change at a pH greater than 8.0. For example, an indicator such as "neutral red" also known as Toluylene Red can be added to indicate a pH change between 6.8 to 8.0 when it evidences a color change from yellow to red. When this indicator is combined with one such as "thymol blue" which changes color at a pH above 8.0, the proper range is clearly delineated.

Still another method for detecting the proper range consists in mixing substances with the paste or powder which produce insoluble precipitates during the setting reaction. Certain metal salts, particularly lead oxide, will change color due to the production of lead sulfate during the reaction.

The following specific examples serve to illustrate more particularly the compositions of the present invention and their prepartion:

Example I

The triethanol amine salt of alginic acid in an amount of 8.5 kilograms was added to 3 kilograms of sodium carbonate, 3 kilograms of calcium carbonate and 0.5 kilogram of titanium oxide and mixed thoroughly. Then, 83 kilograms of water were poured into the mixture and stirring was continued for about two hours. The mixture was then further kneaded on a kneading machine to produce a thick paste of impression material. This paste provided an excellent impression material by mixing with about one tenth of its weight of plaster in about 40 minutes.

Example II

Ten kilograms of the triethanol amine salt of alginic acid were mixed with 90 kilograms of water, and stirred for about two hours to produce a viscous liquid. Five kilograms of sodium carbonate, 1 kilogram of sodium bicarbonate, 5 kilograms of calcium carbonate, and 20 grams of menthol oil were then blended into the mixture by means of a kneader to produce a thick paste of the impression material. This paste could be employed for taking impressions in the same manner as the material of Example I.

Example III

Ten kilograms of the triethanol amine salt of alginic acid and 15 kilograms of sodium carbonate were mixed into 40 kilograms of water and the mixture was stirred thoroughly for about one hour to produce a very thick paste. The paste was dried in an air dryer in thin layers at temperatures of about 70° C. for four hours. Then, the dried substance was put into a powdering machine and was mixed and powdered together with 10 kilograms of calcium carbonate and 20 kilograms of plaster to produce a powder type impression material. This material could be employed for impression taking by mixing with an adequate amount of water.

Example IV

Ten kilograms of the triethanol amine salt of alginic acid, 13 kilograms of sodium carbonate, 2 kilograms of sodium bicarbonate, 10 kilograms of calcium carbonate, and 200 grams of menthol oil were mixed with 50 kilograms of water thoroughly by spatulating the mixture for about two hours to produce a thick paste. The paste was put on vessels as thin layers and dried in sunlight for about twelve hours. The dried material was mixed and powdered on a powdering machine together with 20 kilograms of plaster. The powder type impression material obtained in this way could be used for taking impressions in the same manner as the material in Example III.

*Example V*

Ten kilograms of a finely divided powder of the triethanol amine salt of alginic acid were mixed with 10 kilograms of finely powdered sodium carbonate, ten kilograms of finely divided magnesium carbonate, five kilograms of finely divided calcium carbonate, and 20 kilograms of plaster of Paris powder to produce a powder type impression material. This material could be used for impression taking by mixing it with three times its weight of water.

*Example VI*

Thirty grams of a 0.2% alcohol solution of "neutral red" indicator was added to the 10 kilograms of paste type impression material described in Example II. This material evidenced an almost white color at the point B of FIGURE 15 and changed to a pink color when it approached the point C. Thus it was possible to very definitely indicate the proper time of insertion which should occur when the color was changing from white to a light pink.

*Example VII*

Seventy-five grams of the 0.2% alcohol solution of "neutral red" and 125 grams of a 0.2% alcohol solution of thymol blue were added to 10 kilograms of the paste type impression material described in Example I. This impression material evidenced a blue or bluish gray color at the point A of FIGURE 15 which changed to almost white at the point B. Finally, as the material approached the point C in FIGURE 15, the material evidenced a pink color.

*Example VIII*

One kilogram of cobalt sulfate and 0.5 kilogram of aluminum hydroxide were added to 10 kilograms of the powder type impression material of Example III. This material evidenced a color change of from yellow to white when the reaction had proceeded to the "BC" state.

*Example IX*

Two kilograms of cobalt hydroxide and 0.2 kilogram of magnesium silicate were added to 10 kilograms of the powder type impression material prepared as in Example IV. This material evidenced a color change of yellow to white when passing through the "BC" range.

*Example X*

One kilogram of lead oxide was added to 10 kilograms of the powder type impression material prepared as in Example V. The resulting material evidenced a color change from yellowish brown to white when going through the "BC" range.

While the foregoing examples all deal with the preferred material, namely the triethanol amine salt of alginic acid, it should be recognized that good results can also be obtained from the other alkanol amine salts of alginic acid. The specific examples are purely for purposes of illustration and it should be evident that various modifications can be made to them without departing from the scope of the present invention.

We claim as our invention:

1. An impression composition comprising an alkanol amine salt of alginic acid an alkali metal salt of carbonic acid, said alkali metal being selected from the group consisting of sodium and potassium, and each alkanol radical having from 1 to 2 carbon atoms.

2. An impression composition comprising an alkanol amine salt of alginic acid and sodium carbonate, each alkanol radical having from 1 to 2 carbon atoms.

3. An impression composition comprising an alkanol amine salt of alginic acid and potassium carbonate, each alkanol radical having from 1 to 2 carbon atoms.

4. An impression composition comprising an alkanol amine salt of alginic acid and sodium bicarbonate, each alkanol radical having from 1 to 2 carbon atoms.

5. An impression composition comprising an alkanol amine salt of alginic acid and potassium bicarbonate, each alkanol radical having from 1 to 2 carbon atoms.

6. An impression composition comprising an alkanol amine salt of alginic acid, each alkanol radical having from 1 to 2 carbon atoms, an alkali metal salt of carbonic acid, said alkali metal being selected from the group consisting of sodium and potassium, and a water insoluble carbonate.

7. An impression composition comprising an alkanol amine salt of alginic acid, each alkanol radical having from 1 to 2 carbon atoms an alkali metal salt of carbonic acid, said alkali metal being selected from the group consisting of sodium and potassium, and calcium carbonate.

8. An impression composition comprising one part by weight of an alkanol amine salt of alginic acid, each alkanol radical having from 1 to 2 carbon atoms, from 0.3 to 1.4 parts by weight of an alkali metal salt of carbonic acid, said alkali metal being selected from the group consisting of sodium and potassium, from 0.3 to 2.0 parts by weight of a water insoluble carbonate, and sufficient water to form a paste.

9. The composition of claim 8 in which said alkanol amine is triethanol amine.

10. The composition of claim 8 in which said alkali metal salt is sodium carbonate.

11. The composition of claim 8 in which said water insoluble carbonate is calcium carbonate.

12. An impression composition comprising one part by weight of an alkanol amine salt of alginic acid, each alkanol radical having from 1 to 2 carbon atoms, from 1 to 3 parts by weight of an alkali metal salt of carbonic acid, said alkali metal being selected from the group consisting of sodium and potassium, and 1 to 3 parts by weight of a water insoluble carbonate, said composition being in the form of dry, finely divided particles.

13. An impression composition comprising an alkanol amine salt of alginic acid, each alkanol radical having from 1 to 2 carbon atoms, an alkali metal salt of carbonic acid, said alkali metal being selected from the group consisting of sodium and potassium, and an indicator which provides a discernible color change at a pH less than 8.0.

14. The composition of claim 13 which also includes an indicator which provides a discernible color change at a pH greater than 8.0.

References Cited by the Examiner

UNITED STATES PATENTS

| | | | |
|---|---|---|---|
| 2,020,311 | 11/1935 | Harrison | 106—38.5 |
| 2,021,058 | 11/1935 | Harrison | 106—38.5 |
| 2,345,255 | 3/1944 | Gross | 106—209 |
| 2,584,508 | 2/1952 | Speakman et al. | 260—209.6 |
| 2,599,445 | 6/1952 | Gordon | 106—35 |
| 2,733,157 | 1/1956 | Cornell et al. | 106—38.5 |
| 2,798,816 | 7/1957 | Knappwost | 106—35 |
| 2,881,161 | 4/1959 | Kohler et al. | 260—209.6 |

ROBERT F. WHITE, *Primary Examiner.*

MORRIS LIEBMAN, ALEXANDER H. BRODMERKEL, *Examiners.*